US009527985B2

(12) United States Patent
Okamatsu

(10) Patent No.: US 9,527,985 B2
(45) Date of Patent: Dec. 27, 2016

(54) TIRE PUNCTURE SEALANT, AND TIRE PUNCTURE REPAIR KIT USING SAME

(71) Applicant: THE YOKOHAMA RUBBER CO., LTD., Minato-Ku, Tokyo (JP)

(72) Inventor: Takahiro Okamatsu, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 14/780,006

(22) PCT Filed: Mar. 25, 2014

(86) PCT No.: PCT/JP2014/058347
§ 371 (c)(1),
(2) Date: Sep. 25, 2015

(87) PCT Pub. No.: WO2014/157239
PCT Pub. Date: Oct. 2, 2014

(65) Prior Publication Data
US 2016/0060432 A1 Mar. 3, 2016

(30) Foreign Application Priority Data

Mar. 27, 2013 (JP) ................................. 2013-066921

(51) Int. Cl.
B29C 73/16 (2006.01)
C08K 5/053 (2006.01)
C08K 5/5419 (2006.01)

(52) U.S. Cl.
CPC ........... C08K 5/5419 (2013.01); B29C 73/163 (2013.01); C08K 5/053 (2013.01)

(58) Field of Classification Search
CPC .................................................. B29C 73/163
USPC ....................................... 524/503, 506, 528
See application file for complete search history.

(56) References Cited

U.S. PATENT DOCUMENTS

| 5,981,646 A * | 11/1999 | Huber ..................... B60C 1/00 524/501 |
| 6,443,202 B1 * | 9/2002 | Burton ................. B60C 13/002 152/524 |
| 8,148,448 B2 | 4/2012 | Takahara et al. |
| 2012/0041099 A1 | 2/2012 | Takahara |
| 2013/0172465 A1 | 7/2013 | Okamatsu et al. |

FOREIGN PATENT DOCUMENTS

| CN | 102906213 A | 1/2013 |
| JP | 2011-026533 A | 2/2011 |
| JP | 2011-162681 A | 8/2011 |
| JP | 2011-225768 A | 11/2011 |
| JP | 2012-057145 A | 3/2012 |

OTHER PUBLICATIONS

Office Action issued on Aug. 11, 2016 to corresponding Chinese Patent Application No. 201480018299.1 and its partial English translation.

* cited by examiner

Primary Examiner — Vu A Nguyen
(74) Attorney, Agent, or Firm — Carrier Blackman & Associates, P.C.; Joseph P. Carrier; Anne G. Sabourin

(57) ABSTRACT

An object of the present invention is to provide a tire puncture sealant excellent in sealing performance even in a small amount. The present invention is a tire puncture sealant which contains a synthetic resin emulsion A, and a natural rubber latex and/or a synthetic resin emulsion B, in which the surface free energy of the synthetic resin emulsion A is from 20 to 50 mJ/m$^2$, and the solid content of the synthetic resin emulsion A is from 5 to 25 parts by mass per 100 parts by mass of the solid content of the natural rubber latex and/or the solid content of the synthetic resin emulsion B, and a tire puncture repair kit using the same.

6 Claims, No Drawings

TIRE PUNCTURE SEALANT, AND TIRE PUNCTURE REPAIR KIT USING SAME

TECHNICAL FIELD

The present invention relates to a tire puncture sealant, and a tire puncture repair kit using same.

BACKGROUND

Conventionally, a tire puncture sealant (tire puncture temporary repair sealant) has been used to repair the puncture of a tire. The applicant of the present application has proposed a tire puncture sealant including a natural rubber latex (Patent Documents 1 and 2).

Conventionally, the liquid volume of a tire puncture sealant has been determined in accordance with the size (internal area) of an applicable tire. That is, for the tire puncture sealant, the volume in which the entire tire internal area is uniformly wetted has been a requisite volume.

PRIOR ART DOCUMENT

Patent Document

Patent Document 1: Japanese Unexamined Patent Application Publication No. 2011-162681A
Patent Document 2: Japanese Unexamined Patent Application Publication No. 2011-026533A

SUMMARY OF THE INVENTION

Problem to be Solved by the Invention

However, after being used for puncture repairs, most tire puncture sealants are recovered from within the tire, and disposed. Thus, environmental measures are considered to be necessary.

Therefore, an object of the present invention is to provide a tire puncture sealant that reduces the amount of a tire puncture sealant and is excellent in sealing performance even in a small amount.

Meanwhile, since a silicone emulsion cannot seal puncture due to the reason that an inner liner which constitutes the inside of a tire repels the silicone emulsion, silicone emulsion has not been used for the tire puncture sealant.

Means to Solve the Problem

The present inventor has conducted diligent studies in order to solve the above-mentioned problems and consequently completed the present invention by finding that adding a specific amount of a synthetic resin emulsion having surface free energy from 20 to 50 mJ/m² enables the amount of a tire puncture sealant to be reduced, providing excellent sealing performance even in a small amount.

Specifically, the present invention provides the following 1 to 6.

1. A tire puncture sealant, comprising: a synthetic resin emulsion A; and a natural rubber latex and/or a synthetic resin emulsion B,
a surface free energy of the synthetic resin emulsion A being from 20 to 50 mJ/m²,
a solid content of the synthetic resin emulsion A being from 5 to 25 parts by mass per 100 parts by mass of the solid content of the natural rubber latex and/or the solid content of the synthetic resin emulsion B.

2. The tire puncture sealant according to the above 1, wherein the synthetic resin emulsion A is a silicone emulsion.

3. The tire puncture sealant according to the above 1 or 2, wherein the synthetic resin emulsion B is an ethylene-vinyl acetate copolymer emulsion and/or a polyvinyl acetate emulsion.

4. The tire puncture sealant according to any one of the above 1 to 3, further containing an antifreezing agent, wherein the antifreezing agent is at least one selected from the group consisting of ethylene glycol, propylene glycol, diethylene glycol and glycerin.

5. The tire puncture sealant according to any one of the above 1 to 4,
containing the natural rubber latex and the synthetic resin emulsion B,
wherein the solid content of the natural rubber latex is from 20 to 85 parts by mass and the solid content of the synthetic resin emulsion B is from 15 to 80 parts by mass based on a total of 100 parts by mass of the solid content of the natural rubber latex and the solid content of the synthetic resin emulsion B.

6. A tire puncture repair kit comprising the tire puncture sealant described in any one of the above 1 to 5.

Effect of the Invention

The tire puncture sealant of the present invention is excellent in sealing performance in a smaller amount than those of conventional tire puncture sealants.

The tire puncture repair kit of the present invention is compact, and is excellent in sealing performance.

BEST MODE FOR CARRYING OUT THE INVENTION

The present invention is described in detail below.

The tire puncture sealant according to the present invention is a tire puncture sealant containing: a synthetic resin emulsion A; and a natural rubber latex and/or a synthetic resin emulsion B,
the surface free energy of the synthetic resin emulsion A being from 20 to 50 mJ/m²,
the solid content of the synthetic resin emulsion A being from 5 to 25 parts by mass per 100 parts by mass of the solid content of the natural rubber latex and/or the solid content of the synthetic resin emulsion B.

It is considered that the tire puncture sealant according to the present invention is excellent in sealing performance in a smaller amount than those of conventional tire puncture sealants by the fact that the surface free energy of the synthetic resin emulsion A is from 20 to 50 mJ/m².

The inventor of the present application believes that the reason that the usage amount of the tire puncture sealant according to the present invention is less than those of conventional tire puncture sealants is that the tire puncture sealant includes the synthetic resin emulsion A with small surface free energy, thereby allowing the tire puncture sealant to have good wettability with respect to rubber.

It should be noted that the above-mentioned mechanism is an inference of the inventor of the present application, and even a tire puncture sealant having a different mechanism is within the scope of the invention of the present application.

The synthetic resin emulsion A will be described below. The synthetic resin emulsion A contained in the tire puncture sealant of the present invention is a dispersion system which includes a synthetic resin a as a dispersoid, and includes water as a dispersion medium. The synthetic resin a is capable of forming emulsion particles included in the synthetic resin emulsion A. The synthetic resin emulsion A includes the synthetic resin a as a solid content.

In the present invention, the surface free energy of the synthetic resin emulsion A is from 20 to 50 mJ/m$^2$. The surface free energy of the synthetic resin emulsion A is preferably from 20 to 45 mJ/m$^2$ from the viewpoint that the tire puncture sealant gains good wettability, which reduces the usage amount of the tire puncture sealant more and, accordingly, is more excellent in sealing performance.

In the surface free energy of the synthetic resin emulsion of the present invention, a platinum plate was immersed in the synthetic resin emulsion, and the energy generated at the time of withdrawing the platinum plate from the synthetic resin emulsion at a rate of 10 mm/min was measured under conditions of 25° C. with a surface tension balance (manufactured by Kyowa Interface Science Co, Ltd.). The natural rubber latex and the tire puncture sealant are alike.

The synthetic resin emulsion A is preferably a silicone emulsion; a polyolefin emulsion (as commercial products, for example, Oral Rehydration Salts C101: 40 mJ/m$^2$ produced by Orionnkasei) such as polyethylene or polypropylene; and a polyisobutylene emulsion (as commercial products, for example, Joncryl: 38 mJ/m$^2$ produced by BASF SE) from the viewpoint that the tire puncture sealant gains good wettability, which reduces the usage amount of the tire puncture sealant more and, accordingly, is more excellent in sealing performance.

Examples of a silicone emulsion include an emulsion of reactive silicone oil (capable of crosslinking reaction in combination with a catalyst or curing at high temperature), an emulsion of dimethyl silicone oil with a viscosity of less than 10,000 mm$^2$/s, and an emulsion of long-chain alkyl group-containing silicone oil.

The production of the synthetic resin emulsion A is not particularly limited. Examples thereof include conventionally known products. The synthetic resin emulsion A may be used alone or in combinations of two or more types.

In the present invention, the solid content (the amount of the solid content) of the synthetic resin emulsion A is from 5 to 25 parts by mass per 100 parts by mass of the solid content of the natural rubber latex and/or the solid content of the synthetic resin emulsion B (total of 100 parts by mass of these solid contents when combining the natural rubber latex and the synthetic resin emulsion B). The solid content of the synthetic resin emulsion A is preferably from 5 to 20 parts by mass, and more preferably from 5 to 15 parts by mass per 100 parts by mass of the above solid contents from the viewpoint that the tire puncture sealant gains good wettability, which reduces the usage amount of the tire puncture sealant more, and, accordingly, is more excellent in sealing performance.

The natural rubber latex will be described below. A natural rubber latex that can be contained in the tire puncture sealant of the present invention is not particularly limited. Examples thereof include conventionally known natural rubber latexes. The natural rubber latex may be stabilized by ammonia or the like. Furthermore, the natural rubber latex may be a deproteinized natural rubber latex. The natural rubber latex includes a natural rubber as a solid content.

The synthetic resin emulsion B will be described below. A synthetic resin emulsion B that the tire puncture sealant of the present invention can contain is a dispersion system which includes a synthetic resin b as a dispersoid, and includes water as a dispersion medium. The synthetic resin b is capable of forming emulsion particles included in the synthetic resin emulsion B. The synthetic resin emulsion B includes the synthetic resin b as a solid content.

The surface free energy of the synthetic resin emulsion B is not particularly limited. For example, this energy can be 50 mJ/m$^2$ or more, can be a value exceeding 50 mJ/m$^2$ and can be 55 mJ/m$^2$ or more. Further, this energy can be, for example, 80 mJ/m$^2$ or less, and can be 75 mJ/m$^2$ or less.

The surface free energy of the synthetic resin b is not particularly limited. For example, this energy can be from 50 to 75 mJ/m$^2$, and can be a value exceeding 50 mJ/m$^2$ and can be 55 mJ/m$^2$ or more.

The synthetic resin emulsion B is preferably an ethylene-vinyl acetate copolymer emulsion and/or a polyvinyl acetate emulsion from the viewpoint that the tire puncture sealant gains good wettability, which reduces the usage amount of the tire puncture sealant more, and, accordingly, is more excellent in sealing performance.

The ethylene-vinyl acetate copolymer included in the ethylene-vinyl acetate copolymer emulsion is not particularly limited as long as it is a copolymer produced using at least ethylene and vinyl acetate as a monomer. Examples of a monomer other than ethylene and vinyl acetate include a vinyl group-containing compound such as vinyl versatate.

Examples of an ethylene-vinyl acetate copolymer emulsion include an ethylene-vinyl acetate copolymer emulsion (binary system) and an ethylene vinyl acetate vinyl versatate copolymer (ternary system).

The production of the synthetic resin emulsion B is not particularly limited. Examples thereof include conventionally known products. The synthetic resin emulsion B may be used alone or in combinations of two or more types.

In cases when the tire puncture sealant of the present invention contains a natural rubber latex and a synthetic resin emulsion B, the solid content (the amount of the solid content) of the synthetic resin emulsion B is preferably from 15 to 80 parts by mass, more preferably from 15 to 60 parts by mass and even more preferably from 20 to 50 parts by mass based on a total of 100 parts by mass of the solid content of the natural rubber latex and the solid content of the synthetic resin emulsion B from the view point that the tire puncture sealant gains good wettability, which reduces the usage amount of the tire puncture sealant more, and, accordingly, is more excellent in sealing performance.

In addition, the solid content (the amount of the solid content) of the natural rubber latex is preferably from 20 to 85 parts by mass, more preferably from 20 to 60 parts by mass and even more preferably from 30 to 50 parts by mass based on the above total of 100 parts by mass from the same reason.

It is one of preferable aspects that the tire puncture sealant of the present invention further contains an antifreezing agent. In cases where the tire puncture sealant of the present invention further contains an antifreezing agent, the sealant is excellent in storage stability. The antifreezing agent is preferably at least one selected from the group consisting of ethylene glycol, propylene glycol, diethylene glycol and glycerin from the viewpoint of being more excellent in sealing performance and being excellent in storage stability and workability.

The amount of the antifreezing agent is preferably from 50 to 400 parts by mass and more preferably from 60 to 350 parts by mass per a total of 100 parts by mass of the solid contents of the synthetic resin emulsion A, and the natural rubber latex and/or the synthetic resin emulsion B from the viewpoint of being more excellent in sealing performance and being excellent in storage stability and workability.

It is one of preferable aspects that the tire puncture sealant of the present invention further contains a surfactant. Examples thereof may include an anionic surfactant such as alkyl sulfate, alkali metal salt of rosin, alkylbenzene sulfonic acid, polyoxyethylene alkyl phenyl ether sulfate ester salt, alkylnaphthalenesulfonate, polyoxymono and di-styrylphenylether sulfosuccinate monoester salt, or alkylphenoxypolyoxyethylenepropylsulfonate; a non-ionic surfactant such as polyoxyethylenealkylether or polyoxyethylenealkylphenylether; and a cationic surfactant such as tetra-alkylammonium chloride, trialkyl benzyl ammonium chloride, alkylamine, monooxyethylene alkylamine, or polyoxyethylene alkylamine.

The surfactant may be used alone or in combinations of two or more types.

The amount of the surfactant is preferably from 1 to 5 parts by mass, and more preferably from 2 to 4 parts by mass per a total of 100 parts by mass of the solid contents of the synthetic resin emulsion A, and a natural rubber latex and/or a synthetic resin emulsion B.

The tire puncture sealant of the present invention may contain additives such as a tackifier, a filler, an antiaging agent, an antioxidant, a pigment (dye), a plasticizer, a thixotropic agent, a UV absorbent, a flame retardant, a dispersant, a dehydrating agent, or an antistatic agent as necessary as desired with the exception of the above-mentioned components.

The method of producing the tire puncture sealant of the present invention is not particularly limited. Examples thereof include a method of producing the tire puncture sealant by putting a synthetic resin emulsion A, and a natural rubber latex and/or a synthetic resin emulsion B, and an antifreezing agent, a surfactant and additives which can be used as desired into a container and mixing them under reduced pressure using a stirrer such as a mixer.

The surface free energy of the tire puncture sealant of the present invention is preferably from 35 to 60 $mJ/m^2$ from the viewpoint that the tire puncture sealant gains good wettability, which reduces the usage amount of the tire puncture sealant more and, accordingly, is more excellent in sealing performance.

The amount of water in the tire puncture sealant of the present invention is not particularly limited. The water amount can be, for example, from 30 to 50 parts by mass per a total of 100 parts by mass of the solid content of the synthetic resin emulsion A, and the natural rubber latex and/or the synthetic resin emulsion B.

The usage amount of the tire puncture sealant of the present invention can be, for example, from 350 to 400 mL per tire with a size of 195/65 R15. Rubber in the inside of a tire is not particularly limited. An example thereof includes butyl rubber. The surface free energy of the rubber in the inside of the tire is preferably from 35 to 65 $mJ/m^2$ from the viewpoint that the tire puncture sealant gains good wettability, which reduces the usage amount of the tire puncture sealant more and, accordingly, is more excellent in sealing performance.

Further, the usage amount of the tire puncture sealant of the present invention may be selected as appropriate in accordance with the size of a puncture hole or the like.

The tire puncture sealant of the present invention can be used as, for example, a tire puncture repair fluid for temporary repairs that can be squeezed by hand.

Further, the method for use of the tire puncture sealant of the present invention is not particularly limited. For example, first, the tire puncture sealant of the present invention is injected into the tire from an air filling unit. The method for injecting the tire puncture sealant of the present invention into the tire is not particularly limited, and it is possible to use a conventionally known method, for example, a method involving use of a syringe or a spray.

Next, the tire is filled with air until a predetermined air pressure is reached.

The vehicle is then driven. An aggregate of a synthetic resin or the like can be formed by the compression force and shearing force received when the tire rotates and grounds to seal a puncture hole. It should be noted that the method for use of the tire puncture sealant of the present invention is not limited to the above method.

The tire puncture sealant of the present invention can be incorporated into a tire puncture repair kit.

The tire puncture repair kit of the present invention will be described below.

The tire puncture repair kit of the present invention is a tire puncture repair kit having the tire puncture sealant of the present invention.

The tire puncture sealant used for the tire puncture repair kit of the present invention is not particularly limited as long as it is the tire puncture sealant of the present invention.

The tire puncture repair kit of the present invention is capable of including, for example, a syringe, a spray, a compressor and an emulsion coagulant except for the tire puncture sealant.

The method for use of the tire puncture repair kit of the present invention is not particularly limited. Examples thereof include conventionally known substances.

EXAMPLES

The present invention will be described below by means of working examples. The present invention is not limited to such working examples.

<Production of Tire Puncture Sealing Materials>

The components shown in Table 1 were uniformly mixed in the amounts (parts by mass) shown in the same Table so as to produce tire puncture sealants.

<Evaluation>

The lower limits of the usage amounts of tire puncture sealants capable of sealing the puncture of tires were evaluated using the tire puncture sealants produced as described above by the following methods. The results are shown in Table 1.

First, one hole was punctured by penetrating a nail with a diameter of 4 mm through the tread shoulder part of a tire with a size of 195/65R15.

Rubber of the tread shoulder part of the tire was butyl rubber, and surface free energy thereof was 50 $mJ/m^2$. The surface free energy of the rubber was obtained from the Fowkes formula by using droplets of water and methylene iodide as a liquid, and measuring the contact angle of the droplets formed on the rubber under conditions of 25° C. with a contact angle meter manufactured by Kyowa Interface Science Co., LTD.

Subsequently, the tire with the hole punctured was mounted on a drum test machine, 200 to 600 mL of the tire puncture sealants produced as described above was injected from the valve opening of the tire, and air was filled so that the tire internal pressure reaches 200 kPa.

Thereafter, the above tire was allowed to drive for 10 minutes under conditions of a load of 350 kg and a speed of 30 km per hour, and after driving, an evaluation by means of visual confirmation and treatment for spraying a soap solution in the vicinity of the punctured hole was made to confirm whether an air leak was eliminated. The lower limits of the usage amounts of tire puncture sealants are shown in Table 1.

TABLE 1

| Components of tire puncture sealants | | | *1 | Surface free energy*2 | Comparative Example 1 | Comparative Example 2 | Comparative Example 3 | Comparative Example 4 | Working Example 1 | Working Example 2 | Working Example 3 | Working Example 4 | Working Example 5 |
|---|---|---|---|---|---|---|---|---|---|---|---|---|---|
| | | | | | Columns up to silicone emulsion show solid content amount (parts by mass) in latex show solid content amount (parts by mass) in latex | | | | | | | | |
| NR latex | 1 | HYTEX HA | 60 | 68 | 50 | ← | ← | ← | ← | ← | ← | ← | ← |
| EVA emulsion | 1 | S400HQ | 55 | 74 | 35 | ← | ← | ← | ← | ← | ← | ← | ← |
| | 2 | S951HQ | 55 | 76 | 15 | ← | ← | ← | ← | ← | ← | ← | ← |
| | | Total of solid contents | | | 100 | ← | ← | ← | ← | ← | ← | ← | ← |
| Silicone emulsion | 1 | MF23 | 31 | 24 | | 1 | 2 | 4 | 6 | 8 | 10 | 15 | 20 |
| | 2 | OFFCON-T | 38 | 35 | | | | | | | | | |
| | 3 | X-52-8048 | 53 | 42 | | | | | | | | | |
| | 4 | KM797 | 38 | 55 | | | | | | | | | |
| | 5 | KM862T | 59 | 61 | | | | | | | | | |
| Surfactant | 1 | SDS | | | 2.5 | ← | ← | ← | ← | ← | ← | ← | ← |
| | 2 | POE | | | 2.5 | ← | ← | ← | ← | ← | ← | ← | ← |
| Antifreezing agent | 1 | Propylene glycol | | | 80 | ← | ← | | | | | 80 | |
| | 2 | Ethylene glycol | | | | | | 80 | | | 80 | | |
| | 3 | Diethylene glycol | | | | | | | 80 | | | | 80 |
| | 4 | Glycerin | | | | | | | | 80 | | | |
| Surface free energy of tire puncture sealants (mJ/m²) | | | | | 65 | 70 | 65 | 65 | 50 | 53 | 48 | 50 | 45 |
| Amount of water in tire puncture sealants | | | | | 45 | 45 | 44 | 43 | 41 | 40 | 38 | 37 | 34 |
| Sealable liquid quantity (mL) 30 km/h less than 10 min. Tire: 195/65R15 | | | | | 550 | 500 | 550 | 550 | 400 | 400 | 400 | 350 | 400 |

| Components of tire puncture sealants | | | *1 | Surface free energy*2 | Comparative Example 5 | Comparative Example 6 | Working Example 6 | Working Example 7 | Comparative Example 7 | Comparative Example 8 | Comparative Example 9 | Working Example 8 |
|---|---|---|---|---|---|---|---|---|---|---|---|---|
| | | | | | Columns up to silicone emulsion show solid content amount (parts by mass) in latex show solid content amount (parts by mass) in latex | | | | | | | |
| NR latex | 1 | HYTEX HA | 60 | 68 | ← | ← | ← | ← | ← | ← | 100 | ← |
| EVA emulsion | 1 | S400HQ | 55 | 74 | ← | ← | ← | ← | ← | ← | | |
| | 2 | S951HQ | 55 | 76 | ← | ← | ← | ← | ← | ← | | |
| | | Total of solid contents | | | ← | ← | ← | ← | ← | ← | ← | ← |
| Silicone emulsion | 1 | MF23 | 31 | 24 | 30 | 40 | | | | | | 20 |
| | 2 | OFFCON-T | 38 | 35 | | | 6 | | | | | |
| | 3 | X-52-8048 | 53 | 42 | | | | 6 | | | | |
| | 4 | KM797 | 38 | 55 | | | | | 6 | | | |
| | 5 | KM862T | 59 | 61 | | | | | | 6 | | |
| Surfactant | 1 | SDS | | | ← | ← | ← | ← | ← | ← | ← | ← |
| | 2 | POE | | | ← | ← | ← | ← | ← | ← | ← | ← |
| Antifreezing agent | 1 | Propylene glycol | | | | | 80 | ← | ← | ← | ← | ← |
| | 2 | Ethylene glycol | | | 80 | | | | | | | |
| | 3 | Diethylene glycol | | | | | | | | | | |
| | 4 | Glycerin | | | | 80 | | | | | | |
| Surface free energy of tire puncture sealants (mJ/m²) | | | | | 67 | 65 | 50 | 55 | 70 | 65 | 70 | 40 |
| Amount of water in tire puncture sealants | | | | | 30 | 26 | 41 | 41 | 41 | 41 | 40 | 40 |
| Sealable liquid quantity (mL) 30 km/h less than 10 min. Tire: 195/65R15 | | | | | Non-sealable | Non-sealable | 400 | 400 | 550 | 550 | 550 | 400 |

*1 Mass % of solid contents included in each latex and emulsion
*2 Surface free energy of each latex or emulsion (mJ/m²)

The details of each component shown in Table 1 are as follows.

NR latex 1: Trade name Hytex HA produced by Fell fetch box Co., Ltd., Nomura trade Co., Ltd., Natural rubber latex EVA Emulsion 1: Trade name Sumikaflex S 400HQ produced by Sumika Chemtex Co., Ltd., Resin emulsion of ethylene-vinyl acetate copolymer EVA Emulsion 2: Trade name Sumikaflex S 951HQ produced by Sumika Chemtex Co., Ltd., Resin emulsion of ethylene-vinyl acetate vinyl versatate copolymer Silicone emulsion 1: Trade name MF23 produced by Shin-Etsu Chemical Co., Ltd., Emulsion of reactive silicone oil Silicone emulsion 2: Trade name OFFCON-T produced by Shin-Etsu Chemical Co., Ltd., Emulsion of low-viscosity (10 to 1,000 $mm^2/s$) dimethyl silicone oil Silicone emulsion 3: Trade name x-52-8048 produced by Shin-Etsu Chemical Co., Ltd., Emulsion of long-chain alkyl group containing silicone oil Silicone emulsion 4: Trade name KM797 produced by Shin-Etsu Chemical Co., Ltd., Emulsion of high-viscosity (100,000 to 1,000,000 $mm^2/s$) dimethyl silicone oil Silicone emulsion 5: Trade name KM862T produced by Shin-Etsu Chemical Co., Ltd., Emulsion of medium-viscosity (10,000 $mm^2/s$) dimethyl silicone oil Surfactant 1 SDS: Sodium lauryl sulfate, anionic surfactant produced by Wako Pure Chemical Industries, Ltd.

Surfactant 2 POE: Polyoxyethylene alkyl ether, nonionic surfactant, Emulgen 109 produced by Kao Corporation Antifreezing agent 1: Propylene glycol produced by Wako Pure Chemical Industries, Ltd.

Antifreezing agent 2: Etylene glycol produced by Wako Pure Chemical Industries, Ltd.

Antifreezing agent 3: Dietylene glycol produced by Wako Pure Chemical Industries, Ltd.

Antifreezing agent 4: Glycerin produced by Wako Pure Chemical Industries, Ltd.

As is clear from the results shown in Table 1, Comparative Examples 1 and 9 that do not contain the synthetic resin emulsion A required very large usage amounts of the tire puncture sealants to seal the puncture holes. Comparative Examples 2 to 4 in which the solid content of the synthetic resin emulsion A was less than 5 parts by mass per 100 parts by mass of the solid content of the natural rubber latex and/or the solid content of the synthetic resin emulsion B required very large usage amounts of the tire puncture sealants. Comparative Examples 5 and 6 in which the solid content of the synthetic resin emulsion A exceeds 25 parts by mass per 100 parts by mass of the solid content of the natural rubber latex and/or the solid content of the synthetic resin emulsion B were not able to seal puncture holes. Comparative Examples 7 and 8 in which the surface free energy of all of the synthetic resin emulsions exceeds 50 $mJ/m^2$ required very large usage amounts of the tire puncture sealants.

In contrast, Working Examples 1 to 8 required a small usage amount of the tire puncture sealants to seal puncture holes.

Also, in all working examples and comparative examples, approximately all of the usage amount of the tire puncture sealants was recovered after the puncture repair. This recovered amount was also less in working examples than in comparative examples.

Thus, the tire puncture sealant of the present invention can be used at a reduced amount and is excellent in sealing property. Further, the amount (amount of waste materials) of the tire puncture sealant after use can be reduced. Since the usage amount of the tire puncture sealant can be reduced, the tire puncture repair kit of the present invention is compact, thus leading to a reduction (MCD) of the cost of the kit.

What is claimed is:

1. A tire puncture sealant comprising:
   a synthetic resin emulsion A;
   a natural rubber latex and/or a synthetic resin emulsion B, and
   an antifreezing agent,
   a surface free energy of the synthetic resin emulsion A being from 20 to 50 $mJ/m^2$,
   a solid content of the synthetic resin emulsion A being from 5 to 25 parts by mass per 100 parts by mass of a solid content of the natural rubber latex and/or a solid content of the synthetic resin emulsion B.

2. The tire puncture sealant according to claim 1, wherein the synthetic resin emulsion A is a silicone emulsion.

3. The tire puncture sealant according to claim 1, wherein the synthetic resin emulsion B is an ethylene-vinyl acetate copolymer emulsion and/or a polyvinyl acetate emulsion.

4. The tire puncture sealant according to claim 1, wherein the antifreezing agent is at least one selected from the group consisting of ethylene glycol, propylene glycol, diethylene glycol and glycerin.

5. The tire puncture sealant according to claim 1, containing the natural rubber latex and the synthetic resin emulsion B, wherein the solid content of the natural rubber latex is from 20 to 85 parts by mass; and the solid content of the synthetic resin emulsion B is from 15 to 80 parts by mass based on a total of 100 parts by mass of the solid content of the natural rubber latex and the solid content of the synthetic resin emulsion B.

6. A tire puncture repair kit comprising the tire puncture sealant described in claim 1.

* * * * *